United States Patent
Kang (10) Patent No.: US 11,807,205 B2
(45) Date of Patent: Nov. 7, 2023

(54) RCTB SYSTEM OF VEHICLE AND CONTROL METHOD THEREOF

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 126 days.

(21) Appl. No.: 17/552,587

(22) Filed: Dec. 16, 2021

(65) Prior Publication Data

US 2022/0234557 A1 Jul. 28, 2022

(30) Foreign Application Priority Data

Jan. 26, 2021 (KR) .................. 10-2021-0010896

(51) Int. Cl.
*B60T 7/22* (2006.01)
*B60T 8/24* (2006.01)
*B60T 7/00* (2006.01)

(52) U.S. Cl.
CPC ............. *B60T 7/22* (2013.01); *B60T 8/245* (2013.01); *B60T 2210/20* (2013.01); *B60T 2210/32* (2013.01); *B60T 2230/08* (2013.01); *B60T 2250/04* (2013.01)

(58) Field of Classification Search
CPC .... B60T 7/22; B60T 2210/20; B60T 2210/32; B60T 2230/08; B60T 2250/04
See application file for complete search history.

(56) References Cited

U.S. PATENT DOCUMENTS

| 10,960,863 B2* | 3/2021 | Uraoka ............... F16D 63/00 |
| 2017/0057474 A1 | 3/2017 | Zeng et al. |
| 2021/0188252 A1* | 6/2021 | Lu ..................... B60W 40/12 |

FOREIGN PATENT DOCUMENTS

| DE | 199 44 556 A1 | 3/2001 |
| DE | 10 2016 102 542 A1 | 8/2016 |
| JP | 2001-122094 A | 5/2001 |

(Continued)

OTHER PUBLICATIONS

Extended European Search Report dated May 25, 2022 in counterpart European Patent Application No. 21215552.7 (7 pages in English).

(Continued)

*Primary Examiner* — Adam D Tissot
(74) *Attorney, Agent, or Firm* — NSIP Law (57) ABSTRACT

A method for controlling a rear collision traffic assist brake (RCTB) system of a vehicle includes: receiving information on an ego vehicle and an obstacle; performing braking by calculating the received information and generating a reference braking pressure when a collision with the obstacle is predicted; storing a location of the ego vehicle at a reference point in time for generating the reference braking pressure, a speed of the ego vehicle, an estimated reference collision distance, which is a distance from the ego vehicle to an estimated collision point with the obstacle, and an estimated reference collision time; monitoring whether normal braking is performed based on the stored data; and generating an additional braking pressure to increase a total braking pressure when it is determined that the normal braking is not performed during the monitoring.

14 Claims, 4 Drawing Sheets

(56) References Cited

FOREIGN PATENT DOCUMENTS

KR 10-1521870 B1 5/2015
WO WO 2006/097467 A1 9/2006

OTHER PUBLICATIONS

Chinese Office Action dated Apr. 23, 2023, in counterpart Chinese Patent Application No. 202210090240.X (5 pages in Chinese).

* cited by examiner

RCTB SYSTEM OF VEHICLE AND CONTROL METHOD THEREOF

CROSS-REFERENCE TO RELATED APPLICATION

The present application claims priority to Korean Patent Application No. 10-2021-0010896, filed Jan. 26, 2021, the entire contents of which is incorporated herein for all purposes by this reference.

BACKGROUND OF THE INVENTION

1. Field of the Invention

The present invention relates to a rear collision traffic assist brake (RCTB) system for preventing a rear collision of a vehicle.

2. Description of the Related Art

The RCTB system is a safety system that prevents a vehicle from colliding with an obstacle approaching from a rear side when a driver tries to pull the vehicle out from a parking state in which it is difficult to observe the rear side, etc., and warns the driver and actively brakes to prevent a collision when a collision is predicted.

However, despite the operation of the RCTB system as described above, there is a problem in that the possibility of collision with a rear-side approach obstacle remains due to the state of a road or the state of a vehicle.

That is, although the RCTB system detects a rear-side approach obstacle and performs braking, actual braking performance may not be sufficiently exhibited depending on the condition of the vehicle or road, and thus there is a possibility that a collision accident may occur.

The matters described as the background technology of the present invention are only for improving the understanding of the background of the present invention, and should not be taken as acknowledging that they correspond to the prior art already known to those of ordinary skill in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method for controlling a rear collision traffic assist brake (RCTB) system of a vehicle includes: receiving information on an ego vehicle and an obstacle; performing braking by calculating the received information and generating a reference braking pressure when a collision with the obstacle is predicted; storing a location of the ego vehicle at a reference point in time for generating the reference braking pressure, a speed of the ego vehicle, an estimated reference collision distance, which is a distance from the ego vehicle to an estimated collision point with the obstacle, and an estimated reference collision time; monitoring whether normal braking is performed based on the stored data; and generating an additional braking pressure to increase a total braking pressure when it is determined that the normal braking is not performed during the monitoring.

The monitoring the normal braking may include determining whether one or more of the following conditions are satisfied: whether a movement distance of the ego vehicle from the reference point exceeds a threshold movement distance; whether the speed of the ego vehicle exceeds a threshold speed based on an amount of vehicle deceleration; whether an updated estimated collision distance is shorter than the estimated reference collision distance and is less than an estimated threshold collision distance; whether the estimated collision time is shorter than the estimated reference collision time and is less than an estimated threshold collision time; and whether an inclination of a rear side of the ego vehicle inclined downward due to an inclination of a road is more than a threshold inclination.

It may be determined that the normal braking is not performed and the additional braking pressure may be generated when one or more of the conditions are satisfied.

The additional braking pressure may be increased as a degree of deviation of a target physical quantity of each satisfied condition from a corresponding threshold value increases.

The additional braking pressure may be increased as a number of satisfied conditions increases.

The threshold movement distance may be calculated by calculating an estimated movement distance of the ego vehicle using the speed of the ego vehicle at the reference point, the vehicle deceleration estimated by the generation of the reference braking pressure, and an elapsed time from the reference point, and by adding a margin distance to the estimated movement distance.

The threshold speed may be calculated by calculating an estimated speed of the ego vehicle using the speed of the ego vehicle at the reference point, the vehicle deceleration estimated by the generation of the reference braking pressure, and an elapsed time from the reference point, and by adding a margin speed to the estimated speed.

The estimated threshold collision distance may be calculated by calculating an estimated movement distance of the ego vehicle using the speed of the ego vehicle at the reference point, the vehicle deceleration estimated by the generation of the reference braking pressure, and an elapsed time from the reference point, and by subtracting a margin distance from the difference of the estimated movement distance and the estimated reference collision distance.

The estimated threshold collision time may be calculated by subtracting a margin time, after subtracting an elapsed time from the reference point, from the estimated reference collision time.

In another general aspect, a rear collision traffic assist brake RCTB system of a vehicle includes: a radar configured to detect approach of an obstacle in a rear side of an ego vehicle; an input unit configured to receive information on location, speed, driving state of the ego vehicle, and information on the obstacle for the ego vehicle through the radar; a braking device configured to generate a reference braking pressure to perform braking when the received information is calculated and a collision with the obstacle is predicted; an arithmetic storage unit configured to calculate and store the location and speed of the ego vehicle at a reference point in time for generating the reference braking pressure, an estimated reference collision distance, which is a distance from the ego vehicle to an estimated collision point with the obstacle, and an estimated reference collision time; a monitoring unit configured to monitor whether normal braking is performed based on data stored in the arithmetic storage unit; and a control unit configured to control the input unit, the braking device, the arithmetic storage unit, and the monitoring unit, and to generate an additional braking pressure to increase a total braking pressure applied to the braking device when it is determined that the normal braking is not performed.

The monitoring unit may be configured to determine whether one or more of the following conditions are satisfied: whether a movement distance of the ego vehicle from the reference point exceeds a threshold movement distance; whether the speed of the ego vehicle exceeds a threshold speed based on an amount of vehicle deceleration; whether an updated estimated collision distance is shorter than the estimated reference collision distance and is less than an estimated threshold collision distance; whether the estimated collision time is shorter than the estimated reference collision time and is less than an estimated threshold collision time; and whether an inclination of the rear side of the ego vehicle inclined downward due to an inclination of a road is more than a threshold inclination.

The monitoring unit may be configured to determine that the normal braking is not performed when one or more of the conditions are satisfied.

The control unit may be configured to increase the additional braking pressure as a degree of deviation of a target physical quantity of the satisfied condition from a corresponding threshold value increases.

The control unit may be configured to increase the additional braking pressure higher as the number of the satisfied conditions increases.

The monitoring unit may be configured to calculate an estimated movement distance of the ego vehicle by using the speed of the ego vehicle at the reference point, the vehicle deceleration estimated by the generation of the reference braking pressure, and an elapsed time from the reference point, and calculate the threshold movement distance by adding a margin distance to the estimated movement distance.

The monitoring unit may be configured to calculate an estimated speed of the ego vehicle by using the speed of the ego vehicle at the reference point, the vehicle deceleration estimated by the generation of the reference braking pressure, and an elapsed time from the reference point, and calculate the threshold speed by adding a margin speed to the estimated speed.

The monitoring unit may be configured to calculate an estimated movement distance of the ego vehicle by using the speed of the ego vehicle at the reference point, the vehicle deceleration estimated by the generation of the reference braking pressure, and an elapsed time from the reference point, and calculate the estimated threshold collision distance by subtracting a margin distance from the difference between the estimated movement distance and the estimated reference collision distance.

The monitoring unit may be configured to calculate the estimated threshold collision time by subtracting a margin time, after subtracting an elapsed time from the reference point, from the estimated reference collision time.

Other features and aspects will be apparent from the following detailed description, the drawings, and the claims.

DETAILED DESCRIPTION OF THE INVENTION

Specific structural or functional descriptions of the embodiments of the present invention disclosed in this specification or application are only exemplified for the purpose of describing the embodiments according to the present invention, and the embodiments according to the present invention may be implemented in various forms and should not be construed as being limited to the embodiments described in the present specification or application.

Since the embodiment according to the present invention may have various changes and may have various forms, specific embodiments will be illustrated in the drawings and described in detail in the present specification or application. However, this is not intended to limit the embodiment according to the concept of the present invention to a specific disclosed form, and should be understood to include all changes, equivalents, or substitutes included in the spirit and scope of the present invention.

Terms such as first and/or second may be used to describe various elements, but the elements should not be limited by the terms. The above terms are used only for the purpose of distinguishing one element from another element, for example, without departing from the scope of the present invention, a first element may be termed a second element, and similarly the second component may also be referred to as the first component.

When a component is referred to as being "connected" or "contacted" to another component, it is understood that the other component may be directly connected or contacted to the other component, but it should be understood that other components may exist in the middle. On the other hand, when it is said that a certain element is "directly connected" or "directly contacted" to another element, it should be understood that no other element is present in the middle. Other expressions describing the relationship between elements, such as "between" and "immediately between" or "neighboring to" and "directly adjacent to", etc., should be interpreted similarly.

The terms used herein are used only to describe specific embodiments, and are not intended to limit the present invention. The singular expression includes the plural expression unless the context clearly dictates otherwise. In the present specification, terms such as "comprise" or "have" are intended to designate that the described feature, number, step, operation, component, part, or combination thereof exists, and it should be understood that it does not preclude the existence or addition of one or more other features, numbers, steps, operations, components, parts, or combinations thereof.

Unless defined otherwise, all terms used herein, including technical and scientific terms, have the same meaning as commonly understood by one of ordinary skill in the art to which this invention belongs. Terms such as those defined in commonly used dictionaries should be interpreted as meanings consistent with the context of the related art, and unless explicitly defined in the present specification, they are not to be interpreted in an ideal or excessively formal meaning.

Hereinafter, the present invention will be described in detail by describing preferred embodiments of the present invention with reference to the accompanying drawings. Like reference numerals in each figure indicate like elements.

Figure 1:
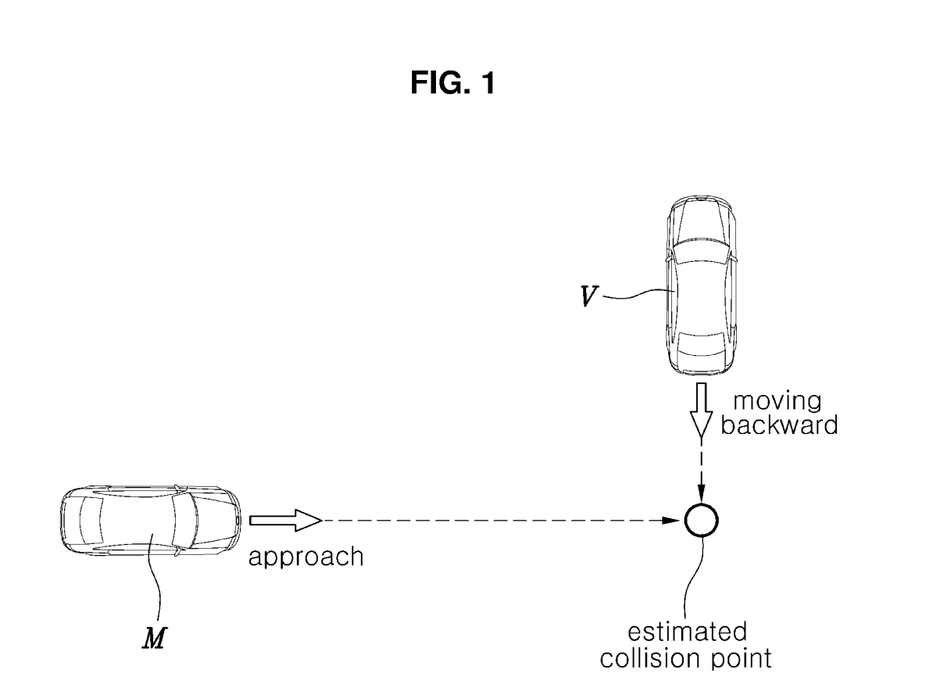
FIG. 1 is a view for explaining a situation to which the present invention can be applied.

Referring to FIG. 1, in a situation where an ego vehicle (V) to which the present invention is applied is moving backward, if an obstacle (M) approaches from the rear side of the ego vehicle (V) and continues to approach, the ego vehicle (V) and the obstacle (M) are going to collide at a predicted collision point as indicated.

Here, the obstacle (M) may be a vehicle as shown, and may be various, such as a pedestrian or a bicycle, and these are collectively referred to as the obstacle (M).

In the above situation, a conventional RCTB system also detects the obstacle (M), warns a driver and operates a braking device 15 to prevent a collision. However, since an expected braking action may not be performed due to the state of the ego vehicle (V) or a road condition, etc., the risk of collision remains. Thus, the control method of FIG. 2 is intended to prepare for such a situation.

Figure 2:
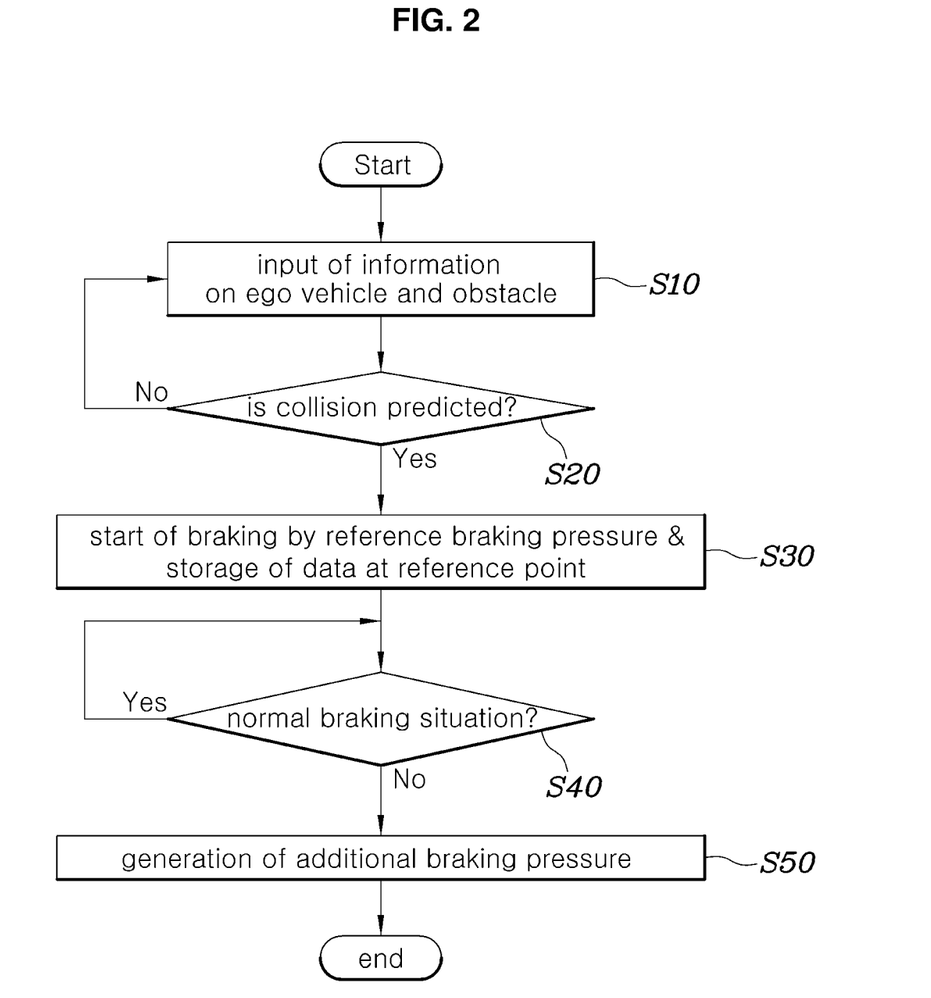
FIG. 2 is a flowchart illustrating an embodiment of a method for controlling an RCTB system of a vehicle according to the present invention.

Referring to FIG. 2, an embodiment of an RCTB system of a vehicle and a control method thereof according to the present invention is configured to include the steps of receiving information on an ego vehicle (V) and an obstacle (M) (S10); performing braking by calculating the received information and generating a predetermined reference braking pressure when a collision with the obstacle (M) is predicted (S20); storing the location of the ego vehicle at a reference point in time for generating the reference braking pressure, the speed of the ego vehicle, an estimated reference collision distance that is a distance from the ego vehicle (V) to an estimated collision point with the obstacle (M), and an estimated reference collision time (S30); monitoring whether normal braking is performed based on the stored data (S40); and generating an additional braking pressure to increase a total braking pressure when it is determined that the normal braking is not performed during the monitoring (S50).

In the present invention, if a collision with a rear-side approach obstacle (M) is predicted in a state in which a vehicle is reversing and the RCTB system starts to operate, the RCTB system starts braking with the reference braking pressure, and then monitors the movement and braking state of the vehicle. When a collision with the obstacle (M) is predicted because normal braking is not achieved despite the braking by the reference braking pressure, the RCTB system generates the additional braking pressure to increase the total braking pressure applied to a braking device 15, so that a collision with the obstacle (M) can be prevented.

Here, the reference braking pressure may be set to a constant value, assuming general vehicle situation and road situation in which a normal braking operation can be made, as in the conventional RCTB system.

In the step of monitoring the normal braking (S40), by using the information on the locations and speeds of the ego vehicle (V) and obstacle (M) that are continuously updated, together with the stored data, it is determined as conditions of whether the movement distance of the ego vehicle (V) from the reference point exceeds a predetermined threshold movement distance; whether the speed of the ego vehicle exceeds a predetermined threshold speed because an amount of vehicle deceleration is small; whether an updated estimated collision distance is shorter than the estimated reference collision distance and is less than a predetermined estimated threshold collision distance; whether the estimated collision time is shorter than the estimated reference collision time and is less than a predetermined estimated threshold collision time; and whether the inclination of the rear side of the ego vehicle (V) inclined downward due to the inclination of a road is more than a predetermined threshold inclination.

During the monitoring as described above, the step of determining that it is not the normal braking when at least one or more of the above conditions are satisfied, and generating the additional braking pressure to increase the total braking pressure is performed.

In this case, the additional braking pressure may be generated to be higher as a degree of deviation of a target physical quantity of the satisfied condition from a corresponding threshold value increases.

For example, when the movement distance of the ego vehicle (V) from the location of the ego vehicle at the reference point exceeds the threshold movement distance and the additional braking pressure is generated, the additional braking pressure is generated higher as a distance in which the movement distance of the ego vehicle (V) exceeds the threshold movement distance is larger.

In addition, the additional braking pressure may be configured to be generated higher as the number of the satisfied conditions increases.

That is, if the number of conditions satisfied among the above conditions is large, it may be determined that the vehicle condition or road condition is unfavorable to the rapid braking of the vehicle, and thus, by generating the additional braking pressure higher correspondingly, insufficient braking performance can be sufficiently compensated.

The threshold movement distance may be calculated by calculating the estimated movement distance of the ego vehicle (V) using the speed of the ego vehicle at the reference point, the vehicle deceleration estimated by the generation of the reference braking pressure, and the elapsed time from the reference point, and by adding a predetermined first margin distance to the estimated movement distance.

That is, since the ego vehicle (V) moves during the elapsed time while the speed of the ego vehicle at the reference point is gradually reduced in the vehicle deceleration, the estimated movement distance may be calculated as the movement distance of the ego vehicle (V) when the speed of the ego vehicle at the reference point is an initial speed and the ego vehicle (V) moves at a constant deceleration during the elapsed time according to the vehicle deceleration.

The first margin distance is a value that may be added to the estimated movement distance in consideration of an error in calculating the estimated movement distance and in order to secure safety, and the first margin distance may be set to a positive value such as at least 0 to 0.2 m.

Therefore, for example, when the estimated movement distance is calculated as 1 meter and the first margin distance is 0.2 meters, the threshold movement distance becomes 1.2 meters. Thus, when the ego vehicle (V) moves more than 1.2 meters from the reference position at the reference point, it is determined that the above condition is satisfied, and the additional braking pressure may be generated.

The threshold speed may be calculated by calculating an estimated speed of the ego vehicle (V) using the speed of the ego vehicle at the reference point, the vehicle deceleration estimated by the generation of the reference braking pressure, and the elapsed time from the reference point, and by adding a predetermined margin speed to the estimated speed.

That is, the estimated speed may be calculated as the speed of the ego vehicle when the speed of the ego vehicle at the reference point is an initial speed and the ego vehicle moves at a constant deceleration during the elapsed time according to the vehicle deceleration.

The margin speed is to take into account an error in calculating the estimated speed and secure safety, and may be added to the estimated speed as a positive value.

For example, when the estimated speed is calculated as 5 km/h and the margin speed is set to 0.05 km/h, the threshold speed becomes 5.05 km/h. Thus, when the current speed of the ego vehicle is 5.02 km/h, it is determined that the condition for generating the braking pressure is not satisfied, but when the current speed of the ego vehicle is 5.4 km/h because braking is not normally performed, it is determined that the condition for generating the additional braking pressure is satisfied.

The estimated threshold collision distance may be calculated by calculating the estimated movement distance of the ego vehicle (V) using the speed of the ego vehicle at the reference point, the vehicle deceleration estimated by the generation of the reference braking pressure, and the elapsed time from the reference point, and by subtracting a predetermined second margin distance from the subtraction of the estimated movement distance from the estimated reference collision distance.

For example, when the estimated reference collision distance at the reference point is calculated as 3 meters, the current estimated movement distance is calculated as 1 meter, and the second margin distance is set to 0.5 meters, the estimated threshold collision distance is calculated as 1.5 meters by subtracting the estimated movement distance from the estimated reference collision distance, which can be calculated as 3−1=2 meters, and then subtracting the second margin distance again from this calculated value, which can be calculated as 2−0.5=1.5 meters.

Accordingly, when the estimated collision distance calculated at the current point in time when the elapsed time has been passed from the reference point is 1.4 meters, which is shorter than the estimated threshold collision distance of 1.5 meters, it may be determined that the condition for generating the additional braking pressure is satisfied.

The estimated threshold collision time may be calculated by subtracting a predetermined margin time after subtracting the elapsed time from the reference point, from the estimated reference collision time.

For example, when the estimated reference collision time predicted at the reference point is 5 seconds, and the elapsed time from the reference point is 2 seconds, the margin time is set to 0.05 seconds, the estimated threshold collision time is calculated by subtracting the elapsed time from the estimated reference collision time, which can be calculated as 5−2=3 seconds, and then by subtracting the margin time from the subtracted value, which can be calculated as 3−0.05=2.95 seconds.

Therefore, when the estimated collision time calculated at the current point in time when the elapsed time has passed from the reference point is calculated as 2.8 seconds, which is less than the estimated threshold collision time of 2.95 seconds, it may be determined that the condition for generating the additional braking pressure is satisfied.

Here, the estimated collision time may be calculated by dividing the distance from the current location of the ego vehicle to the estimated collision point by the speed of the ego vehicle (V). In this case, the speed of the ego vehicle may be taken into consideration as well as being decelerated by a braking operation over time.

Figure 3:
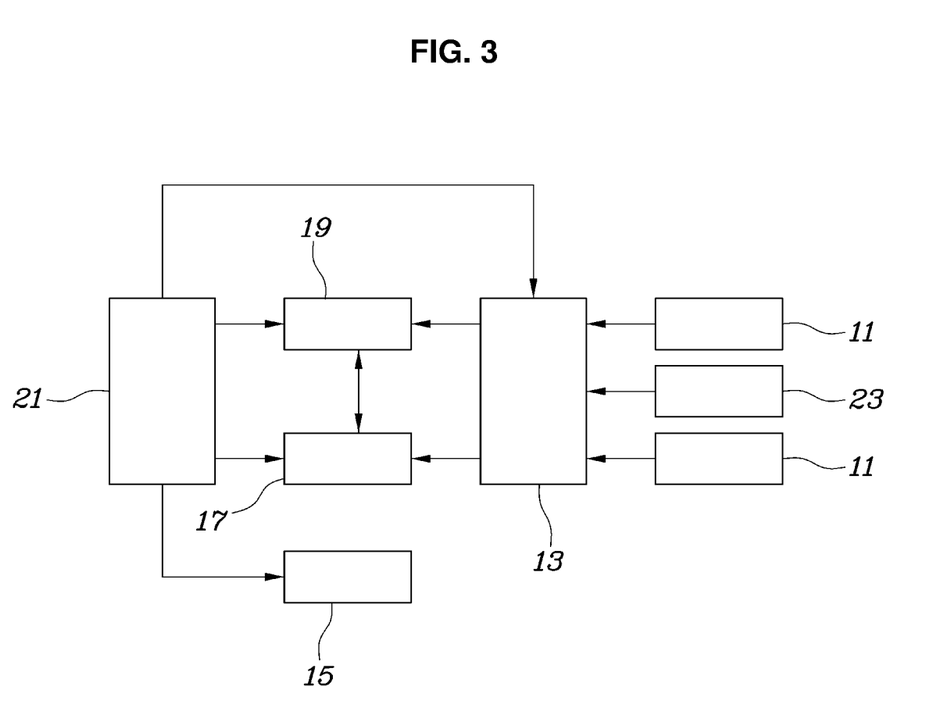
FIG. 3 is a configuration view of an RCTB system of a vehicle according to the present invention.

Referring to FIG. 3, an embodiment of an RCTB system of a vehicle according to the present invention that can implement the control method as described above is configured to include a radar 11 that is provided to detect the approach of the obstacle (M) in the rear side of the vehicle; an input unit 13 that receives information on the location, speed, driving state of the ego vehicle (V) and information on the obstacle (M) for the ego vehicle (V) through the radar 11; a braking device 15 that generates a predetermined reference braking pressure to perform braking when the received information is calculated and a collision with the obstacle (M) is predicted; an arithmetic storage unit 17 that calculates and stores the location and speed of the ego vehicle at a reference point in time for generating the reference braking pressure, an estimated reference collision distance that is a distance from the ego vehicle (V) to an estimated collision point with the obstacle (M), and an estimated reference collision time; a monitoring unit 19 that monitors whether normal braking is performed based on the stored data; and a control unit 21 that controls the input unit 13, the braking device 15, the arithmetic storage unit 17, and the monitoring unit 19, and generates an additional braking pressure to increase a total braking pressure applied on the braking device 15 when it is determined that the normal braking is not performed during the monitoring.

Here, the input unit 13 is configured to receive not only the signal of the radar 11 but also signals of various sensors capable of detecting the location and speed of the ego vehicle (V). In particular, the input unit 13 is configured to receive a signal from an inclination sensor 23 to be described later.

In addition, the input unit 13, the arithmetic storage unit 17, the monitoring unit 19, and the control unit 21 are functionally divided, and there may be a part in which each function is performed in common on specific hardware.

By using the information on locations and speeds of the ego vehicle (V) and obstacle (M) that are continuously updated, together with the data stored in the arithmetic storage unit 17, the monitoring unit 19 may be configured to determine the conditions of whether the movement distance of the ego vehicle (V) from the reference point exceeds a predetermined threshold movement distance; whether the speed of the ego vehicle exceeds a predetermined threshold speed because an amount of vehicle deceleration is small; whether an updated estimated collision distance is shorter than the estimated reference collision distance and is less than a predetermined estimated threshold collision distance; whether the estimated collision time is shorter than the estimated reference collision time and is less than a predetermined estimated threshold collision time; and whether the inclination of the rear side of the ego vehicle (V) inclined downward due to the inclination of the road is more than a predetermined threshold inclination.

Here, the threshold inclination may be set to a predetermined constant value, and the inclination in which the rear side of the ego vehicle (V) is inclined downward due to the inclination of the road may be measured with the inclination sensor 23 provided in the ego vehicle (V).

That is, as the inclination measured by the inclination sensor 23 is greater than the threshold inclination and the rear side of the ego vehicle (V) is severely inclined downward, it may be determined that the condition for generating the additional braking pressure is satisfied when the braking operation is not smoothly performed despite the normal braking of the braking device 15.

The control unit 21 may be configured to determine that it is not the normal braking situation when at least one or more of the above conditions are satisfied, and generate the additional braking pressure to increase the total braking pressure applied to the braking device 15.

Also, the control unit 21 may be configured to generate the additional braking pressure higher as a degree of deviation of the target physical quantity of the satisfied condition from a corresponding threshold value increases.

Meanwhile, the control unit 21 may be configured to generate the additional braking pressure higher as the number of the satisfied conditions increases.

The monitoring unit 19 may be configured to calculate the estimated movement distance of the ego vehicle (V) by using the speed of the ego vehicle at the reference point, the vehicle deceleration estimated by the generation of the reference braking pressure, and the elapsed time from the reference point, and calculate the threshold movement distance by adding a predetermined first margin distance to the estimated movement distance.

The monitoring unit 19 may be configured to calculate the estimated speed of the ego vehicle (V) by using the speed of the ego vehicle at the reference point, the vehicle deceleration estimated by the generation of the reference braking pressure, and the elapsed time from the reference point, and calculate the threshold speed by adding a predetermined margin speed to the estimated speed.

The monitoring unit 19 may be configured to calculate the estimated movement distance of the ego vehicle (V) by using the speed of the ego vehicle at the reference point, the vehicle deceleration estimated by the generation of the reference braking pressure, and the elapsed time from the reference point, and calculate the estimated threshold collision distance by subtracting a predetermined second margin distance from the subtracted of the estimated movement distance from the estimated reference collision distance.

The monitoring unit 19 may be configured to calculate the estimated threshold collision time by subtracting a predetermined margin time after subtracting the elapsed time from the reference point, from the estimated reference collision time.

Figure 4:
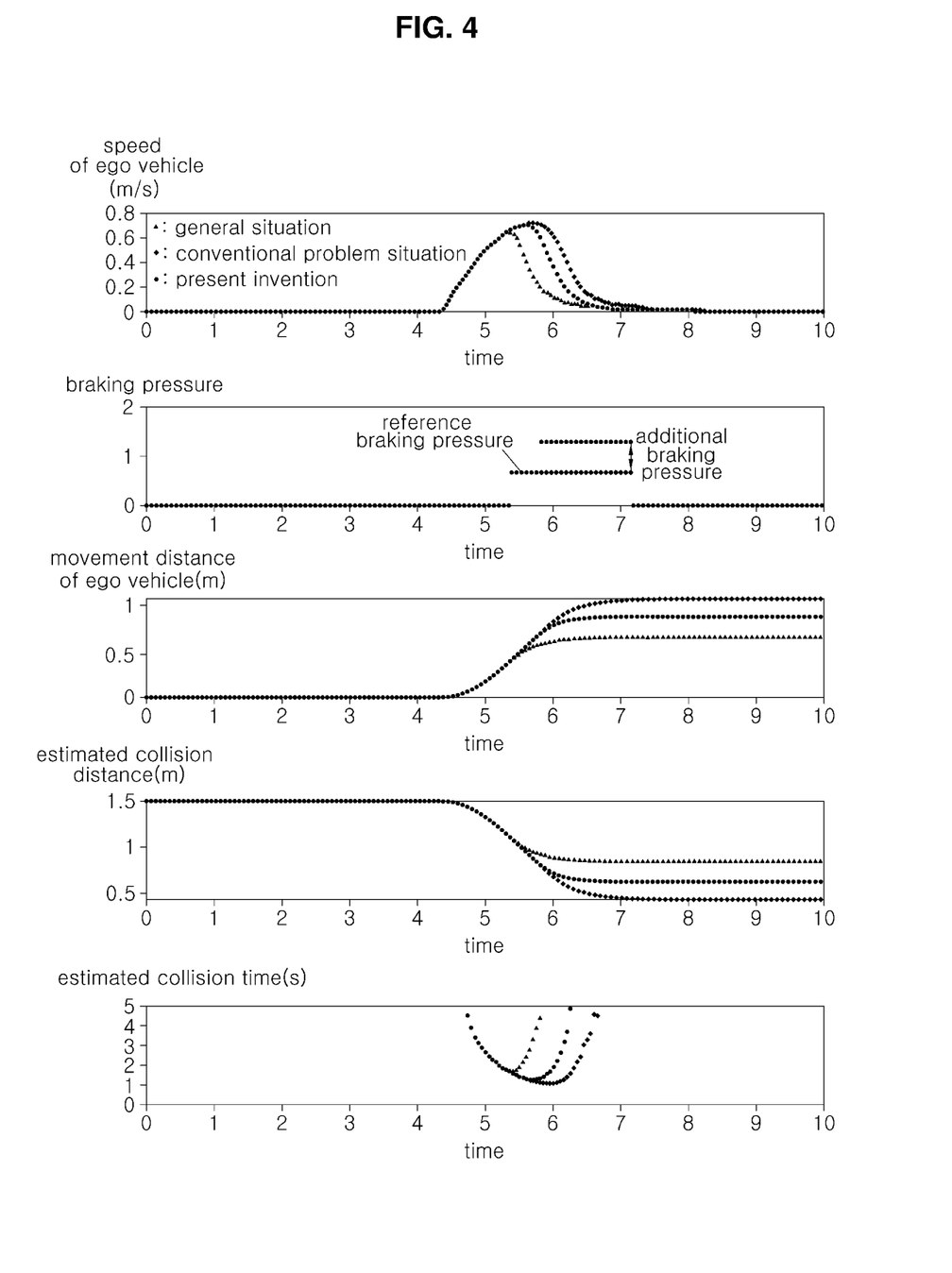
FIG. 4 is a graph illustrating the effect of the present invention.

On the other hand, FIG. 4 is for describing the effect according to the present invention compared to the conventional art, and illustrates the comparison of the change of various physical quantities over time when the RCTB system is operated in a general situation, in a problem situation according to the conventional art, and in a situation according to the present invention.

That is, in the drawing, while the ego vehicle starts moving backward after 4 seconds and the speed of the ego vehicle starts to increase, after 5 seconds, the basic braking pressure starts to operate due to the detection of the rear-side approach obstacle by the RCTB system and the speed of the ego vehicle is reduced. In this case, in a general situation, that is, when the normal braking is performed under the general normal situations of both the vehicle state and the road state, the speed of the ego vehicle is reduced the fastest. But, in a conventional problem situation to which the present invention is not applied, the normal braking is not performed by the state of the vehicle or road and it can be confirmed that the speed of the ego vehicle is reduced the slowest.

When the present invention is applied in the above situation, even when the same problem situation occurs, it can be confirmed that the additional braking pressure is applied, the speed of the ego vehicle is reduced along the curve between the general situation and the conventional problem situation, the movement distance of the ego vehicle is shortened, both the estimated collision distance and the estimated collision time are shortened, and thus, collision avoidance performance is further improved.

Although the present invention has been shown and described with reference to specific embodiments, it will be apparent to those of ordinary skill in the art that the present invention can be variously improved and changed without departing from the spirit of the present invention provided by the following claims.

What is claimed is:

1. A method for controlling a rear collision traffic assist brake (RCTB) system of a vehicle, the method comprising:
   receiving information on an ego vehicle and an obstacle;
   performing braking by calculating the received information and generating a reference braking pressure when a collision with the obstacle is predicted;
   storing a location of the ego vehicle at a reference point in time for generating the reference braking pressure, a speed of the ego vehicle, an estimated reference collision distance, which is a distance from the ego vehicle to an estimated collision point with the obstacle, and an estimated reference collision time as stored data;
   monitoring whether normal braking is performed based on the stored data, the monitoring comprising determining whether one or more conditions are satisfied, the condition including one or more of:
      whether the speed of the ego vehicle exceeds a threshold speed based on an amount of vehicle deceleration;
      whether an updated estimated collision distance is shorter than the estimated reference collision distance and is less than an estimated threshold collision distance; and
      whether an estimated collision time is shorter than the estimated reference collision time and is less than an estimated threshold collision time; and
   generating an additional braking pressure to increase a total braking pressure when it is determined that the normal braking is not performed during the monitoring,
      wherein it is determined that normal braking is not performed and the additional braking pressure is generated when the condition is satisfied, and
      wherein the additional braking pressure is increased as a degree of deviation of a target physical quantity of each satisfied condition from a corresponding threshold value increase.

2. The method according to claim 1, wherein the one or more following conditions further includes:
   whether a movement distance of the ego vehicle from the reference point exceeds a threshold movement distance;
   and
   whether an inclination of a rear side of the ego vehicle inclined downward due to an inclination of a road is more than a threshold inclination.

3. A method for controlling a rear collision traffic assist brake (RCTB) system of a vehicle, the method comprising:
   receiving information on an ego vehicle and an obstacle;
   performing braking by calculating the received information and generating a reference braking pressure when a collision with the obstacle is predicted;
   storing a location of the ego vehicle at a reference point in time for generating the reference braking pressure, a speed of the ego vehicle, an estimated reference collision distance, which is a distance from the ego vehicle to an estimated collision point with the obstacle, and an estimated reference collision time as stored data;
   monitoring whether normal braking is performed based on the stored data, the monitoring comprising determining whether one or more conditions are satisfied, the condition including one or more of:

whether a movement distance of the ego vehicle from the reference point exceeds a threshold movement distance;

whether the speed of the ego vehicle exceeds a threshold speed based on an amount of vehicle deceleration;

whether an updated estimated collision distance is shorter than the estimated reference collision distance and is less than an estimated threshold collision distance;

whether an estimated collision time is shorter than the estimated reference collision time and is less than an estimated threshold collision time;

whether an inclination of a rear side of the ego vehicle inclined downward due to an inclination of a road is more than a threshold inclination; and generating an additional braking pressure to increase a total braking pressure when it is determined that the normal braking is not performed during the monitoring, wherein it is determined that normal braking is not performed and the additional braking pressure is generated when the condition is satisfied, and wherein the additional braking pressure is increased as a number of satisfied conditions increases.

4. The method according to claim 2, wherein the threshold movement distance is calculated by calculating an estimated movement distance of the ego vehicle using the speed of the ego vehicle at the reference point, the vehicle deceleration estimated by the generation of the reference braking pressure, and an elapsed time from the reference point, and by adding a margin distance to the estimated movement distance.

5. The method according to claim 2, wherein the threshold speed is calculated by calculating an estimated speed of the ego vehicle using the speed of the ego vehicle at the reference point, the vehicle deceleration estimated by the generation of the reference braking pressure, and an elapsed time from the reference point, and by adding a margin speed to the estimated speed.

6. The method according to claim 2, wherein the estimated threshold collision distance is calculated by calculating an estimated movement distance of the ego vehicle using the speed of the ego vehicle at the reference point, the vehicle deceleration estimated by the generation of the reference braking pressure, and an elapsed time from the reference point, and by subtracting a margin distance from a difference of the estimated movement distance and the estimated reference collision distance.

7. The method according to claim 2, wherein the estimated threshold collision time is calculated by subtracting a margin time, after subtracting an elapsed time from the reference point, from the estimated reference collision time.

8. A rear collision traffic assist brake RCTB system of a vehicle, the system comprising:

a radar configured to detect approach of an obstacle in a rear side of an ego vehicle;

an input unit configured to receive information on location, speed, driving state of the ego vehicle, and information on the obstacle for the ego vehicle through the radar;

a braking device configured to generate a reference braking pressure to perform braking when the received information is calculated and a collision with the obstacle is predicted;

an arithmetic storage unit configured to calculate and store the location and speed of the ego vehicle at a reference point in time for generating the reference braking pressure, an estimated reference collision distance, which is a distance from the ego vehicle to an estimated collision point with the obstacle, and an estimated reference collision time;

a monitoring unit configured to:

monitor whether normal braking is performed based on data stored in the arithmetic storage unit;

determine whether one or more conditions are satisfied, the conditions including one or more of:

whether the speed of the ego vehicle exceeds a threshold speed based on an amount of vehicle deceleration;

whether an updated estimated collision distance is shorter than the estimated reference collision distance and is less than an estimated threshold collision distance; and whether an estimated collision time is shorter than the estimated reference collision time and is less than an estimated threshold collision time; and determine that the normal braking is not performed when at least one or more of the conditions are satisfied; and a control unit configured to:

control the input unit, the braking device, the arithmetic storage unit, and the monitoring unit;

generate an additional braking pressure to increase a total braking pressure applied to the braking device when it is determined that the normal braking is not performed, wherein the monitoring unit is configured to determine that the normal braking is not performed when one or more of the conditions are satisfied; and increasing the additional braking pressure in proportion with a number of the conditions being satisfied.

9. The RCTB system of a vehicle according to claim 8, wherein the monitoring unit is configured to determine whether one or more of the following conditions are satisfied:

whether a movement distance of the ego vehicle from the reference point exceeds a threshold movement distance;

and whether an inclination of the rear side of the ego vehicle inclined downward due to an inclination of a road is more than a threshold inclination.

10. The RCTB system of a vehicle according to claim 9, wherein the control unit is configured to increase the additional braking pressure as a degree of deviation of a target physical quantity of the satisfied condition from a corresponding threshold value increases.

11. The RCTB system of a vehicle according to claim 9, wherein the monitoring unit is configured to calculate an estimated movement distance of the ego vehicle by using the speed of the ego vehicle at the reference point, the vehicle deceleration estimated by the generation of the reference braking pressure, and an elapsed time from the reference point, and calculate the threshold movement distance by adding a margin distance to the estimated movement distance.

12. The RCTB system of a vehicle according to claim 9, wherein the monitoring unit is configured to calculate an estimated speed of the ego vehicle by using the speed of the ego vehicle at the reference point, the vehicle deceleration estimated by the generation of the reference braking pressure, and an elapsed time from the reference point, and calculate the threshold speed by adding a margin speed to the estimated speed.

13. The RCTB system of a vehicle according to claim 9, wherein the monitoring unit is configured to calculate an estimated movement distance of the ego vehicle by using the speed of the ego vehicle at the reference point, the vehicle deceleration estimated by the generation of the reference braking pressure, and an elapsed time from the reference point, and calculate the estimated threshold collision distance by subtracting a margin distance from the difference between the estimated movement distance and the estimated reference collision distance.

14. The RCTB system of a vehicle according to claim 9, wherein the monitoring unit is configured to calculate the estimated threshold collision time by subtracting a margin time, after subtracting an elapsed time from the reference point, from the estimated reference collision time.

\* \* \* \* \*